(12) United States Patent
Lohmiller et al.

(10) Patent No.: US 10,607,495 B2
(45) Date of Patent: Mar. 31, 2020

(54) METHOD FOR OPERATING AN AT LEAST TEMPORARILY UNMANNED AIRCRAFT OR SPACECRAFT AND AN AIRCRAFT OR SPACECRAFT OF THIS TYPE

(71) Applicant: Airbus Defence and Space GmbH, Taufkirchen (DE)

(72) Inventors: Winfried Lohmiller, Freising (DE); Joerg Meyer, Mainburg (DE); Thomas Heuer, Allershausen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 319 days.

(21) Appl. No.: 15/638,697

(22) Filed: Jun. 30, 2017

(65) Prior Publication Data
US 2018/0005533 A1    Jan. 4, 2018

(30) Foreign Application Priority Data
Jul. 4, 2016   (DE) .................. 10 2016 212 150

(51) Int. Cl.
*G08G 5/00*  (2006.01)
*B64C 39/02*  (2006.01)
(Continued)

(52) U.S. Cl.
CPC ......... *G08G 5/0056* (2013.01); *B64C 39/024* (2013.01); *G05D 1/0011* (2013.01);
(Continued)

(58) Field of Classification Search
CPC .. G08G 5/0056; G08G 5/0013; G08G 5/0039; G08G 5/0052; G08G 5/0069;
(Continued)

(56) References Cited

U.S. PATENT DOCUMENTS 6,377,875 B1 * 4/2002 Schwaerzler ......... B64C 39/024
                                                244/1 R
7,512,462 B2 * 3/2009 Nichols .................. G05D 1/101
                                                340/945
(Continued)

FOREIGN PATENT DOCUMENTS

DE          19849857         5/2000
DE          19849857 A1      5/2000
(Continued)

OTHER PUBLICATIONS

German Search Report, dated Jun. 14, 2017, priority document.
European Search Report, dated Dec. 5, 2017, priority document.
German Search Report; priority document; dated Jun. 14, 2017.

*Primary Examiner* — Richard A Goldman
(74) *Attorney, Agent, or Firm* — Greer, Burns & Crain, Ltd.

(57) ABSTRACT

A method for operating an, at least temporarily, unmanned aircraft or spacecraft wherein a flight procedure of the aircraft or spacecraft is carried out in controlled airspace using a previously cleared flight plan, wherein a C2 link is at least temporarily unavailable, and wherein at least one sensor device of the aircraft or spacecraft identifies a dangerous and/or emergency situation which makes it necessary to deviate from the cleared flight plan. To have available a method which makes it possible for an at least temporarily unmanned aircraft or spacecraft to react independently to particular dangerous and/or emergency situations and to avoid damaging events, a control device of the aircraft or spacecraft independently uses a wireless data link to a supervisory authority in order to agree to a changed flight plan containing at least one change.

24 Claims, 4 Drawing Sheets

(51) Int. Cl.
*G05D 1/00* (2006.01)
*B64F 5/60* (2017.01)
*H04B 7/185* (2006.01)

(52) U.S. Cl.
CPC .......... *G05D 1/0055* (2013.01); *G08G 5/0013* (2013.01); *G08G 5/0039* (2013.01); *G08G 5/0052* (2013.01); *G08G 5/0069* (2013.01); *B64F 5/60* (2017.01); *G08G 5/0091* (2013.01); *H04B 7/18506* (2013.01)

(58) Field of Classification Search
CPC ............... G08G 5/0091; B64C 39/024; B64C 2201/14; B64C 2201/141; B64C 2201/146; G05D 1/0011; G05D 1/0055; B64F 5/60; G04B 7/18506
USPC ........................................................ 701/2, 36
See application file for complete search history.

(56) References Cited

U.S. PATENT DOCUMENTS

| | | | | |
|---|---|---|---|---|
| 7,737,878 | B2* | 6/2010 | van Tooren | G01S 13/9303 244/3.1 |
| 7,885,733 | B1* | 2/2011 | Simon | G01C 23/005 340/979 |
| 8,219,799 | B1* | 7/2012 | Lucchesi | H04L 63/105 713/150 |
| 8,346,578 | B1* | 1/2013 | Hopkins, III | G06Q 40/00 382/100 |
| RE44,606 | E* | 11/2013 | Herz | H04W 4/029 455/445 |
| 9,104,639 | B2* | 8/2015 | Koritnik | G06F 13/14 |
| 9,628,318 | B1* | 4/2017 | Gerdes | H04L 27/122 |
| 9,658,619 | B1* | 5/2017 | Bethke | G08G 5/0069 |
| 9,665,094 | B1* | 5/2017 | Russell | G01P 5/00 |
| 9,714,089 | B1* | 7/2017 | Louw | B64C 39/024 |
| 9,747,809 | B2* | 8/2017 | Levien | G08G 5/04 |
| 9,847,034 | B1* | 12/2017 | Plawecki | G08G 5/0069 |
| 10,279,906 | B2* | 5/2019 | Levien | B64C 39/024 |
| 2003/0075642 | A1* | 4/2003 | Silansky | B64B 1/02 244/30 |
| 2003/0093187 | A1* | 5/2003 | Walker | B64C 13/20 701/1 |
| 2003/0130770 | A1* | 7/2003 | Matos | G08G 5/0056 701/3 |
| 2005/0118952 | A1* | 6/2005 | Cox | B64C 3/42 455/62 |
| 2005/0258942 | A1* | 11/2005 | Manasseh | G07C 5/008 340/425.5 |
| 2006/0106506 | A1 | 5/2006 | Nichols et al. | |
| 2008/0167885 | A1* | 7/2008 | Judd | G08G 5/0013 701/120 |
| 2009/0027253 | A1 | 1/2009 | Van Tooren | |
| 2010/0198514 | A1* | 8/2010 | Miralles | F41G 7/2206 701/302 |
| 2010/0311354 | A1* | 12/2010 | Stayton | H04L 5/02 455/90.1 |
| 2010/0332054 | A1 | 12/2010 | Brandad et al. | |
| 2010/0332122 | A1* | 12/2010 | Weichbrod | G01C 23/005 701/533 |
| 2012/0221175 | A1* | 8/2012 | Spinelli | G01S 19/01 701/2 |
| 2014/0270749 | A1* | 9/2014 | Miniscalco | H04B 10/118 398/5 |
| 2014/0337841 | A1* | 11/2014 | Hyde | H04W 52/0229 718/1 |
| 2015/0365159 | A1* | 12/2015 | Bosworth | G08G 5/0069 455/11.1 |
| 2016/0246304 | A1* | 8/2016 | Canoy | G05D 1/0816 |
| 2016/0363929 | A1* | 12/2016 | Clark | G05D 1/0011 |
| 2017/0073085 | A1* | 3/2017 | Tremblay | A47G 29/141 |
| 2017/0171762 | A1* | 6/2017 | Reis | H04W 16/24 |
| 2017/0188377 | A1* | 6/2017 | Reis | H04W 72/085 |
| 2017/0278409 | A1* | 9/2017 | Johnson | G08G 5/0069 |
| 2017/0282374 | A1* | 10/2017 | Matula | B25J 11/008 |
| 2017/0347285 | A1* | 11/2017 | Luo | G08G 5/0008 |
| 2018/0004201 | A1* | 1/2018 | Zach | G05D 1/0022 |
| 2018/0005533 | A1* | 1/2018 | Lohmiller | B64C 39/024 |
| 2018/0059691 | A1* | 3/2018 | Fleming | G05B 19/0426 |
| 2018/0068567 | A1* | 3/2018 | Gong | H04W 4/022 |
| 2018/0096588 | A1* | 4/2018 | Shabah | H04W 4/90 |
| 2018/0247544 | A1* | 8/2018 | Mustafic | G08G 5/0069 |
| 2018/0253978 | A1* | 9/2018 | Tabuchi | B64C 39/024 |
| 2018/0316416 | A1* | 11/2018 | Reis | H04B 7/18513 |

FOREIGN PATENT DOCUMENTS

| | | |
|---|---|---|
| DE | 102007032084 | 1/2009 |
| DE | 102007032084 A1 | 1/2009 |
| EP | 1657611 | 5/2006 |
| EP | 1657611 B1 | 5/2006 |

* cited by examiner

METHOD FOR OPERATING AN AT LEAST TEMPORARILY UNMANNED AIRCRAFT OR SPACECRAFT AND AN AIRCRAFT OR SPACECRAFT OF THIS TYPE

CROSS-REFERENCES TO RELATED APPLICATIONS

This application claims the benefit of the German patent application No. 10 2016 212 150.2 filed on Jul. 4, 2016, the entire disclosures of which are incorporated herein by way of reference.

FIELD OF THE INVENTION

The invention relates to a method for operating an, at least temporarily, unmanned aircraft or spacecraft (what is referred to as a RPA, remotely piloted aircraft), a flight procedure of the aircraft or spacecraft being carried out in controlled airspace using a previously cleared flight plan, a C2 link via which the aircraft and spacecraft can be or is controlled being at least temporarily unavailable, and at least one sensor device of the aircraft or spacecraft identifying a dangerous and/or emergency situation which makes it necessary to deviate from the cleared flight plan. The invention also relates to an, at least temporarily, unmanned aircraft or spacecraft which travels through a controlled airspace in accordance with a previously cleared flight plan, in which aircraft or spacecraft a C2 link, via which the aircraft or spacecraft can be or is controlled, is at least temporarily unavailable, and which aircraft or spacecraft is provided with a sensor device which identifies a dangerous and/or emergency situation which makes it necessary to deviate from the cleared flight plan.

BACKGROUND OF THE INVENTION

Unmanned aircraft or spacecraft (in the following, this term is used synonymously with the abbreviation RPA) are being used to an increasing extent for transporting loads, for surveillance or reconnaissance missions or also for military tasks. Many people also consider such an option as the future for passenger transportation. However, an aircraft can also be controlled by one or more pilots who, for various reasons, may be unavailable in any case for a particular period of time, which is why the wording "at least temporarily unmanned" has been chosen. Of course, conceptually, "unmanned" only means occupation of the cockpit; irrespective of this, people may or may not be on board the aircraft, whose presence or absence, however, does not affect the control.

The aircraft or spacecraft concerned usually flies through an airspace monitored by intercommunicating stations of the air traffic control (ATC) in accordance with a flight plan which has to be submitted and approved before the flight procedure commences. The only real difference between an unmanned flight procedure and a manned flight procedure can be considered to be that a pilot who is responsible for, and has discretionary control over, flight movements and the changes thereto (known as PIC, pilot in command or also PIL, pilot in the loop) is not simultaneously present in the aircraft or spacecraft, but gives control commands and (co)monitors systems of the aircraft or spacecraft at another location, or what is referred to as an RPS (remote pilot station).

The ability or possibility of influencing the behavior of the aircraft or spacecraft during the flight is provided by a C2 (command & control) link system which establishes various control and communication capabilities. The D2 data link can be realized by a LOS (line of sight) link or by a BLOS (beyond line of sight, i.e., satellite) link, which naturally involves a certain probability of failure.

Thus, via the C2 link, the PIC can control the flight of the, at least temporarily, unmanned aircraft or spacecraft using the flight control system, the drive system or the undercarriage system, can monitor and control the danger avoidance systems (DAA, detect and avoid) of the aircraft or spacecraft, and can assist, for example, with functions such as what is referred to as a "handover" between supervisory authorities or a plurality of what are referred to as remote pilot stations (RPS) during the flight procedure or with the recording of flight data. Furthermore, flight parameters and warnings, for example concerning the electrics, hydraulics, avionics, air conditioning system, engine, structure, weather radar of the control device of the RPA, can be monitored and transmitted to the absent pilot. Finally, it is also possible to use the at least temporarily unmanned aircraft or spacecraft as what is referred to as a relay for a further aircraft or spacecraft or also for another at least temporarily unmanned vehicle on the ground.

The functions of speech transmission and/or data transmission between the aircraft or spacecraft and the pilot, a control center or another pilot are provided by the C2 link. Functions of this type, for example when linking a plurality of RPS, are provided, for example, by commercial telecommunications network providers which provide the C2 link, in which case it is quite possible for the quality of the link itself and of the service (QoS) to vary. If there is no line of sight between a C2 transmission station and the aircraft or spacecraft, it may be necessary to revert to satellite links for transmissions.

SUMMARY OF THE INVENTION

It is an idea of the present invention to provide a method which allows an, at least temporarily, unmanned aircraft or spacecraft to react independently to particular dangerous and/or dangerous and/or emergency situations.

This is achieved, in particular, by a wireless data link, for example a VHF or UHF wireless data link, to a supervisory authority being used independently by a control device of the aircraft or spacecraft to agree to a changed flight plan containing at least one change.

Under conditions in which the C2 link is lost, the at least temporarily unmanned aircraft or spacecraft which is operated in controlled airspace can recognize the necessity to deviate from the previously cleared flight path, for example to avoid severe weather conditions, in the event of engine damage, system failure, hail, fuel shortage or also similar circumstances, without this list claiming to be exhaustive. In this respect, a situation in which it is necessary to fly around bad weather is naturally not an emergency situation, but is merely a potential danger which can be avoided by rescheduling.

In a manned aircraft, the pilot would choose and initiate an alternative route and would call up air traffic control to obtain approval for a deviation from the original flight plan. Since this is not directly possible for the at least temporarily unmanned aircraft or spacecraft when the C2 link is lost, under such conditions, according to the invention, the aircraft or spacecraft will determine a specific path in order to deviate from the approved flight plan. The mentioned changed flight plan is to be understood such that it also comprises a merely temporary deviation from the original plan.

In a variant of the method, the supervisory authority can expediently be formed by a control center or by an air traffic control station (of the ATC) which is capable of and is authorized to carry out interventions of this type in the controlled air traffic. The data link to the supervisory authority can be established via one or more self-flying or earthbound relay stations, and the supervisory authority is itself not necessarily linked to an earthbound station.

In a variant of the method according to the invention, if, for example, the dangerous situation can be controlled by a simple adjustment to the original flight plan, for example by a change in altitude of a limited duration, the control device can transmit at least one clearance request to the supervisory authority, for example to what is referred to as an ATC controller and, following the response therefrom, can react based on the result. The mentioned ATC controller does not necessarily have to be human; thus, this clearance request can also be handled by a machine-machine interaction in case of doubt.

The ATC controller assesses the clearance request received from the RPA and then sends a confirmation in the sense of an approval if the controller considers the change to be safe, or a refusal if said controller considers the change to be unsafe. By means of the clearance request in question, via the wireless data link the control device can make use of all means which can be provided via the wireless data link, i.e., for example, the above-mentioned change in altitude, a change of course or the like.

Since different individual circumstances can have, per se or combined, an influence on the behavior and thereby also on the potentially necessary control of the aircraft or spacecraft, in another variant of the method according to the invention, the sensor device can be formed by at least one sensor arranged on the aircraft or spacecraft, by a data receiving device, by a telemetry system and/or by a function monitoring device.

The situations facing the RPA as aircraft or spacecraft in the airspace each have different degrees of severity in the sense of an emergency classification which, in turn, if at all, may require a reaction which is adapted to this degree of severity. In order to send a clearance request regarding a change to the particular flight plan by the control device to an ATC controller, the dangerous and/or dangerous and/or emergency situations to be identified by the sensor device can be, for example, the development of severe weather conditions, damage to a drive system, the failure of at least one system which is important to or necessary for the flight operation, a hailstorm or a shortage of fuel. However, it is also possible to imagine other dangerous and/or dangerous and/or emergency situations, for example possibly situations which are caused by other flying bodies and which make a change to the flight plan appear appropriate, which change is to be requested by the control device.

In a variant of the method according to the invention, particularly advantageously the wireless data link can be established independently by the control device of the aircraft and spacecraft as a VDL wireless data link, in particular as what is referred to as a Mode 2 link, which is also referred to as a CPDLC (controller pilot data link communication). VDL (from VHF data link) is a method for exchanging data between aircraft and stations on the ground. Mode 2 is a common communications standard; communication would also function using Mode 3 by means of a plurality of channels or using the development Mode 4.

Although, as the name says, the method is really intended to integrate human interaction at input/output devices at the ends of the communication in manned aircraft or spacecraft, it can, however, be used for the purposes required here because the corresponding use provides, in principle, air-ground data communication for ATC services. This includes, for example, clearance options on the part of the controller on the ground (level assignment, intersection restriction, lateral deviations, route changes) and clearance requests and responses to communications by the pilot (who is not in situ in the at least temporarily unmanned case and here, in this particular case, is cut off from communication with the RPA). Since the communications in question (in addition to a free text option) are present in a strictly controlled format, CPDL communication is particularly suitable for use in dangerous and/or emergency situations. A feature of this link between the ATC and the RPA is that this communication is machine-readable by the RPA and, in this respect, is ideally present as digital signals as in the case of the data link connection by CPDLC. However, an analog speech signal which can be interpreted digitally is also conceivable.

The communications exchanged between the RPA and the ATC controller can be converted particularly easily into measures which are to be specifically implemented in the at least temporarily unmanned aircraft or spacecraft, if the control device of the aircraft or spacecraft comprises at least a flight management system (FMS), a flight control system (FCS) or an autopilot system (AP) or is itself part of such a system in each case. Here, the preformatting of the communications to be exchanged into communications which can be interpreted by the flight management system is also helpful, such that values of parameters which are to be changed can be read out directly, for example, or an entire communication can be directly incorporated into the FMS or into other systems.

The most important parameters for avoiding a situation of the airspace through which the particular aircraft or spacecraft specifically travels include the flight direction of the RPA and the flight altitude thereof or specific waypoints, which is why, in advantageous variants of the method, the at least one change to the flight plan comprises at least one change in altitude or a change of course of the aircraft or spacecraft. However, changes to numerous other parameters or waypoints of the particular flight procedure can also be imagined in isolation or combined with one another.

In a variant of the method according to the invention, after a dangerous and/or dangerous and/or emergency situation has been identified, a possible deviation from the flight plan can be established by the at least one control device of the aircraft or spacecraft and at least one dialogue containing the following points can be carried out with the supervisory authority via the wireless data link:

a. transmitting a clearance request regarding the deviating flight plan by the control device of the aircraft or spacecraft;

b. assessing the clearance request by the supervisory authority and producing a positive or negative assessment result;

c. transmitting the assessment result together with the original clearance request back to the aircraft or spacecraft;

d. comparing the returned assessment result with the originally transmitted clearance request, along with a plausibility check;

e. changing the original flight plan based on the assessment result.

Thus, in the mentioned dangerous and/or emergency situation, the control device of the RPA can determine a specific route in order to deviate from the approved flight plan, and can transmit a clearance request, for example, via the VHF data link connection, CPDLC, to the ATC controller. This clearance request makes use of means which are available to the CPDLC, i.e., a change in altitude, a change of course, changed waypoints etc. The ATC controller assesses the clearance request received from the RPA and then sends confirmation in the sense of an approval if said controller considers the change to be safe, or a refusal if said controller considers the change to be unsafe.

An approval or refusal would be transmitted back to the control device of the RPA by the ATC controller via CPDLC together with the original clearance request. In turn, in the RPA, a specific logic of the flight management system would assess the new clearance which has been received, and compare the returned clearance data with the originally sent information in the clearance request in order to ensure a correct transmission.

The control of the RPA in its FMS or FCS or autopilot reacts according to the result sent back by the ATC controller, i.e., the refusal or approval regarding the change to the original flight plan under point e (above). In a variant of the method, if the assessment result is positive, an updated flight plan of the aircraft or spacecraft is then expediently implemented as proposed.

If a correct transmission is confirmed by the on-board logic of the control device of the RPA and a positive clearance has been received, the flight plan is changed according to the clearance received via CPDLC in order to allow the RPA to avoid the severe weather conditions in question or to prevent serious damage to the engine, for example.

On account of the change to the original flight plan under point e., in the event of a negative assessment result, likewise expediently a further dialogue regarding an alternative change to the flight plan for the aircraft or spacecraft is initiated or a different measure is taken. Thus, if the proposed flight plan update is not approved, the control device of the RPA can propose a different/further flight plan update using the above process. After several refusals, the RPA would either remain on the original flight plan or, for particularly serious failure conditions, would deviate therefrom without CPDLC clearance, which is why, in a further expedient variant, the mentioned different measure comprises an unauthorized change to the flight plan being carried out by the control device in a specific emergency program. In this case, the RPA would inform the ATC controller of the deviation from the authorized flight plan via CPDLC.

Advantageously, a variant of the method according to the invention can also be that the communication between the aircraft or spacecraft and the supervisory authority takes place at least to a certain extent using reversed roles and, consequently, the supervisory authority initiates a dialogue with the at least temporarily unmanned aircraft or spacecraft and communicates, to the control device thereof, a deviation from the flight plan as the original proposal or as a counterproposal to a clearance request.

In order for the authority which actually controls the at least temporarily unmanned aircraft or spacecraft to be able to (further) participate in the change or changes to the flight plan, in a further variant of the method according to the invention, it may be expedient to have the supervisory authority check the flight plan change with a remote PIC via an independent communication path. In this case, the supervisory authority and the PIC can communicate via a telephone link, for example.

The idea is also realized by the above-mentioned, at least temporarily unmanned aircraft or spacecraft comprising a control device which independently uses a wireless data link to a supervisory authority in order to agree a changed flight plan containing at least one change.

The above embodiments and developments can be combined as desired in any meaningful manner. Further possible embodiments, developments and implementations of the invention also include not explicitly mentioned combinations of features of the invention which have been previously described or are described in the following with respect to the embodiments. In particular, a person skilled in the art will also add individual aspects as improvements or supplements to the particular basic form of the present invention.

DETAILED DESCRIPTION OF THE PREFERRED EMBODIMENTS

In the following, the invention will be described in more detail on the basis of on an embodiment in the figure of the drawings.

Figure 1:
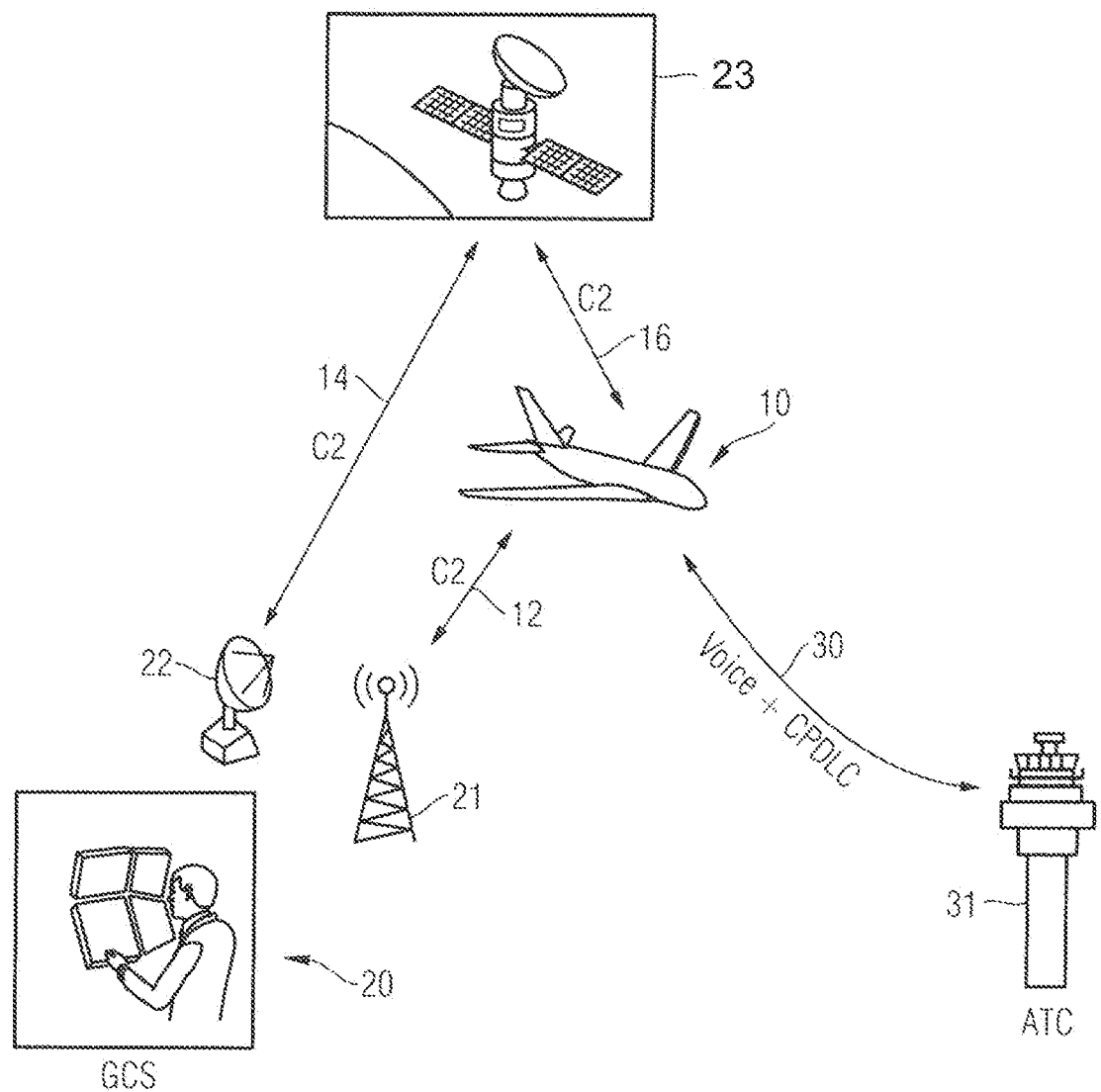
FIG. 1 shows a schematic view of an aircraft connected to a ground station via various links in accordance with the principles of the present invention.

FIG. 1 of the drawings is a highly schematic view of an at least temporarily unmanned aircraft or spacecraft 10 which is connected bidirectionally, i.e., both in uplink and in downlink, to a ground station (GCS) via various C2 links 12, 14, 16, such that a pilot (PIC) (not shown in more detail) who is present in the ground station (GCS, ground control station or ground control segment) 20 can control the aircraft or spacecraft 10.

The various C2 links 12, 14, 16 represent the cases in which the aircraft or spacecraft is addressable by a C2 link 12, on the one hand, via a radio line of sight (RLOS) between a ground switching exchange 21 and the aircraft or spacecraft 10 and, on the other hand, in the absence of a radio line of sight (beyond radio line of sight, BRLOS), by a combination of a plurality of C2 links 14, 16 firstly between a satellite ground station 22 and a satellite 23 and then between the satellite 23 and the aircraft or spacecraft 10. Provided that the delay times during the signal transmission can be kept short, the ground station (GCS) can also be arranged at a distance from the ground stations 21, 22.

A telephone link by which the ground station (GCS) can communicate with the supervisory authority 31, even if the C2 link fails, is not shown in the figure.

The figure also shows a CPDLC link 30 as a wireless data link between the aircraft or spacecraft 10 and a supervisory authority, the ATC controller 31. According to the invention, if the C2 link 12, 14, 16 to the control center is lost, it is intended for it to be possible to agree a changed flight plan, which may be necessary under particular failure/emergency conditions. The flight plan of the aircraft or spacecraft 10 is adapted after clearance from the ATC controller 31 has been received via the wireless data link 30 by means of CPDLC and a data compliance check (comparison between transmitted and received data) has been carried out.

Figure 2A:
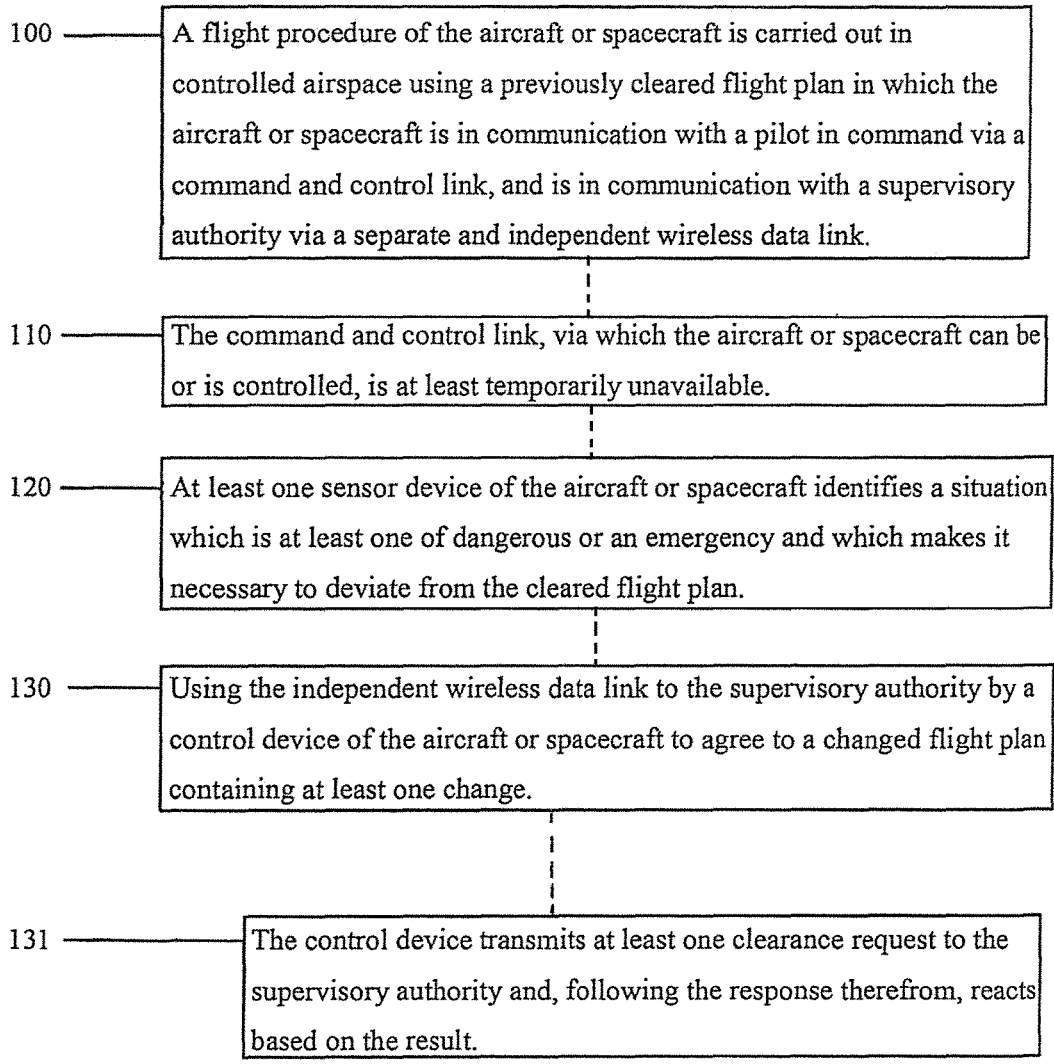
FIGS. 2A, 2B and 2C together show a schematic view of the steps of the method in accordance with the principles of the present invention.
Figure 2A:
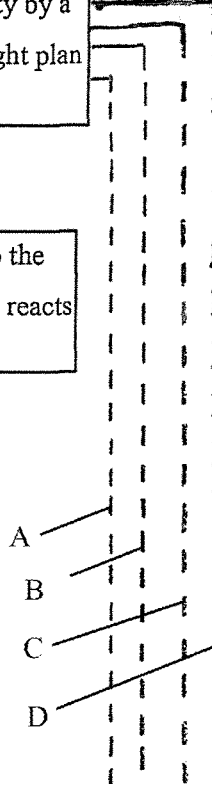
Figure 2B:
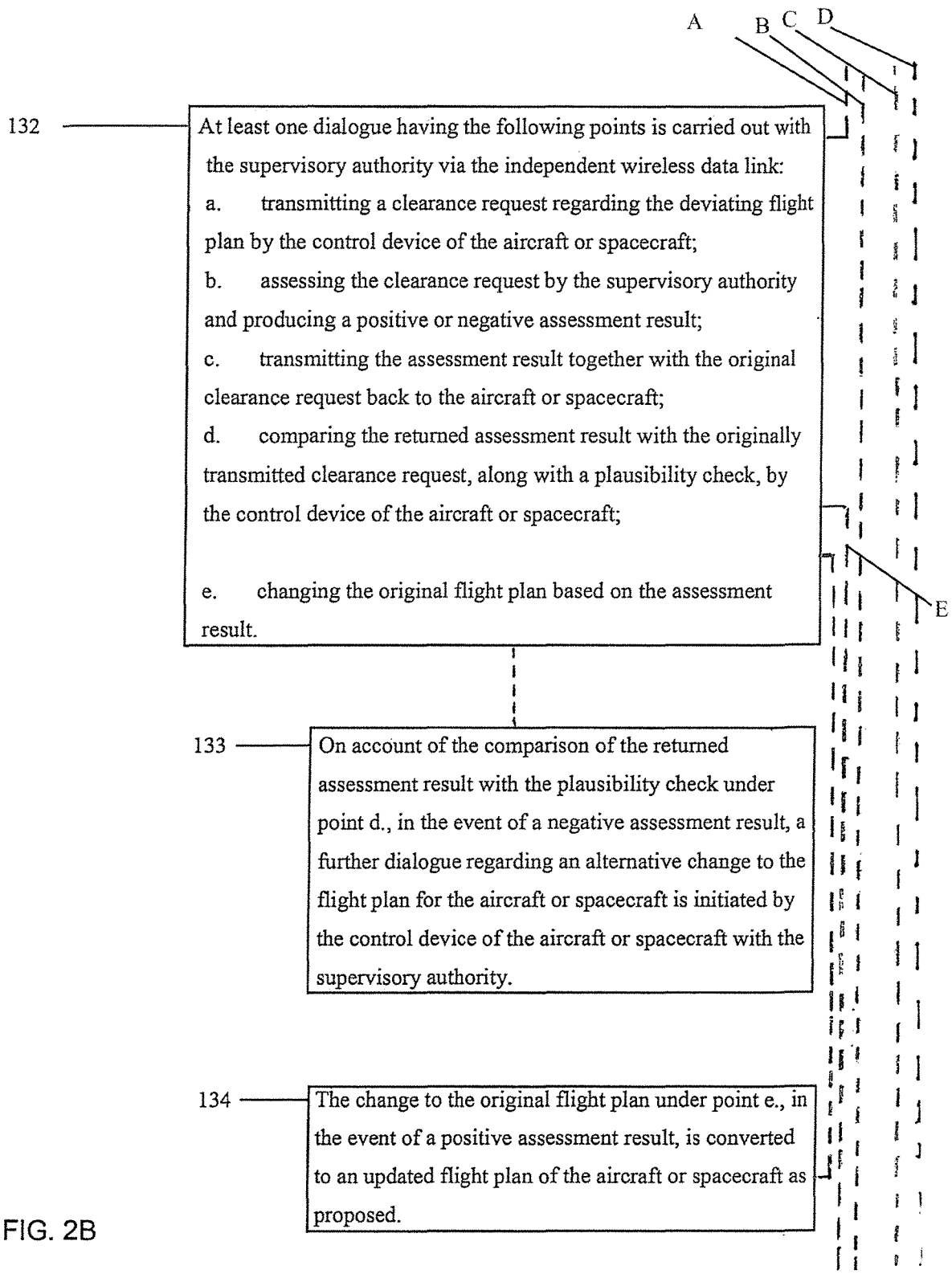
Figure 2C:
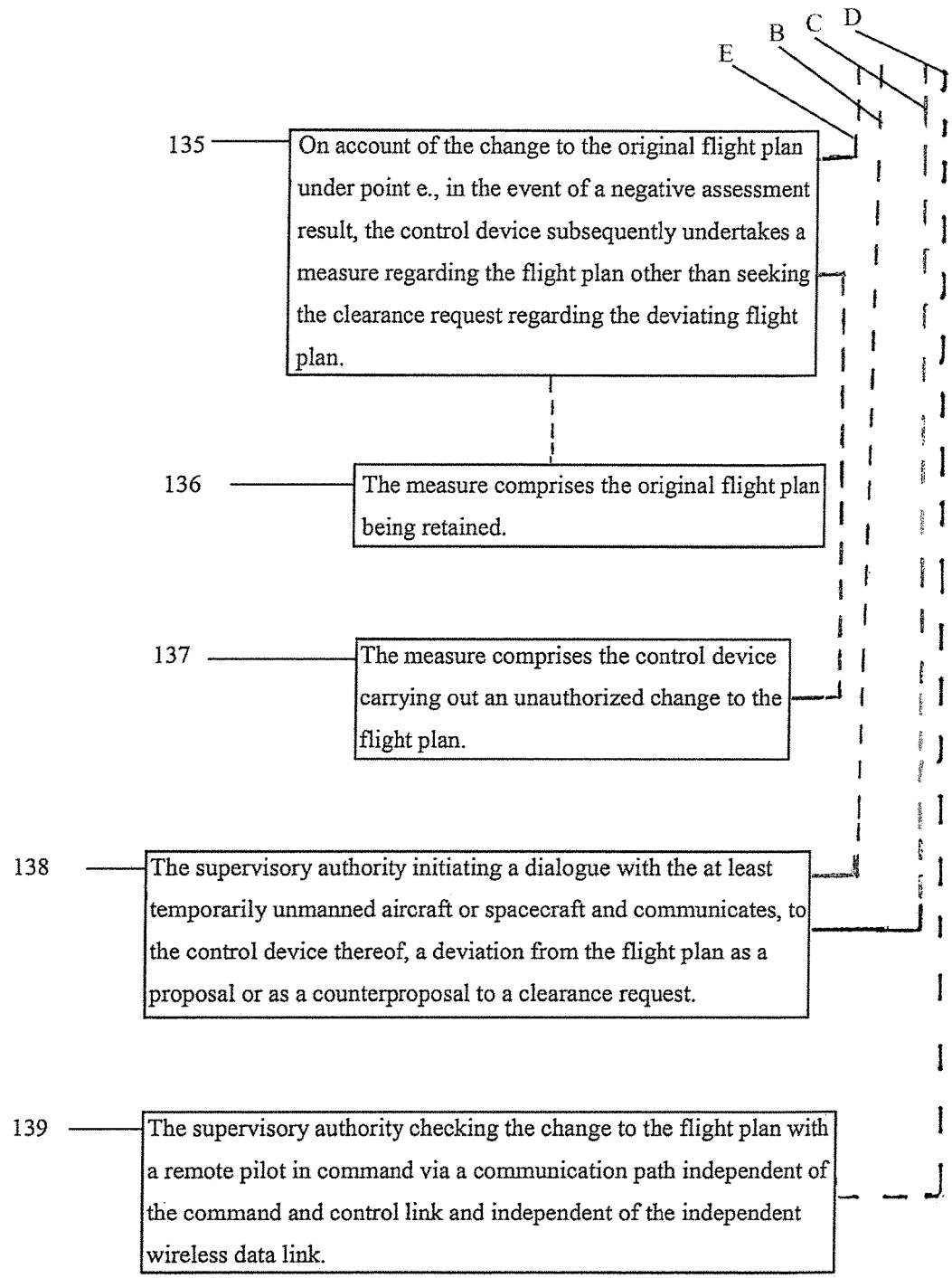

Consequently, a method for operating an at least temporarily unmanned aircraft or spacecraft 10 is established according to the invention, as illustrated in FIGS. 2A-2C, wherein, in step 100, a flight procedure of the aircraft or spacecraft 10 is carried out using a previously cleared flight plan in controlled airspace, in step 110, a C2 link 12, 14, 16 via which the aircraft or spacecraft 10 can be or is controlled is at least temporarily unavailable, and in step 120, at least one sensor device of the aircraft or spacecraft identifies a dangerous and/or emergency situation which makes it necessary to deviate from the cleared flight plan.

The method according to the invention as shown in step 130, a wireless data link 30, via VHF, UHF or another suitable frequency, to a supervisory authority 31 is used independently by a control device of the aircraft or spacecraft 10 to agree a changed flight plan containing at least one change.

As shown in step 131, the control device transmits at least one clearance request to the supervisory authority and, following the response therefrom, reacts based on the result.

In particular, as shown at step 132, after a dangerous and/or emergency situation has been identified, a possible deviation from the flight plan is established by the at least one control device of the aircraft or spacecraft 10, and at least one dialogue containing the following points is carried out with the supervisory authority 31 via the wireless data link 30:

a. transmitting a clearance request regarding the deviating flight plan by the control device of the aircraft or spacecraft 10;

b. assessing the clearance request by the supervisory authority and producing a positive or negative assessment result;

c. transmitting the assessment result together with the original clearance request back to the aircraft or spacecraft 10;

d. comparing the returned assessment result with the originally transmitted clearance request, along with a plausibility check; and e. changing the original flight plan of the at least temporarily unmanned aircraft or spacecraft 10 based on the assessment result.

As shown in step 132, on account of the comparison of the returned assessment result with the plausibility check under point d., in the event of a negative assessment result, a further dialogue regarding an alternative change to the flight plan for the aircraft or spacecraft is initiated by the control device of the aircraft or spacecraft with the supervisory authority.

As shown in step 133, the change to the original flight plan under point e., in the event of a positive assessment result, is converted to an updated flight plan of the aircraft or spacecraft as proposed.

As shown in step 134, on account of the change to the original flight plan under point e., in the event of a negative assessment result, the control device subsequently undertakes a measure regarding the flight plan other than seeking the clearance request regarding the deviating flight plan.

As shown in step 135, the measure undertaken comprises the original flight plan being retained.

As shown in step 135, alternatively, the measure undertaken comprises the control device carrying out an unauthorized change to the flight plan.

As shown in step 136, the supervisory authority initiates a dialogue with the at least temporarily unmanned aircraft or spacecraft and communicates, to the control device thereof, a deviation from the flight plan as a proposal or as a counterproposal to a clearance request.

As shown in step 137, the supervisory authority checks the change to the flight plan with a remote pilot in command via a communication path independent of the command and control link and independent of the independent wireless data link.

A C2 link 12, 14, 16, via which the aircraft or spacecraft 10 can be or is controlled, is at least temporarily unavailable to the particular at least temporarily unmanned aircraft or spacecraft 10 which flies through a controlled airspace according to a previously cleared flight plan.

The aircraft or spacecraft 10 is provided with a sensor device, which identifies a dangerous and/or emergency situation which makes it necessary to deviate from the cleared flight plan, and thus according to the invention agrees a changed flight plan, having at least one change, by means of a control device which independently uses a wireless data link 30 to a supervisory authority 31.

The described mechanism can be used for all relevant conditions without time pressure, i.e., when sufficient time is available for the RPA to identify appropriate deviations from the flight plan and to communicate the clearance requests to the ATC controller 31 so that said ATC controller can assess these clearance requests and send a response via a wireless data link 30, for example a CPDLC link.

A system and method as described above have the advantage of making it possible to make a change to the cleared flight plan when the link has been lost and, while so doing, making use of established methods of manned air travel using minimal effort.

Although the present invention has been described above with reference to various embodiments, it is not restricted thereto, but can be modified in many different ways. In particular, the invention can be altered or modified in various ways without departing from the crux of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for operating an at least temporarily unmanned aircraft or spacecraft,
 wherein a flight procedure of the aircraft or spacecraft is carried out in controlled airspace using a previously cleared flight plan in which the aircraft or spacecraft is in communication with a pilot in command via a command and control link, and is in communication with a supervisory authority via a separate and independent wireless data link,
 wherein the command and control link, via which the aircraft or spacecraft can be or is controlled, is at least temporarily unavailable, and
 wherein at least one sensor device of the aircraft or spacecraft identifies a situation which is at least one of dangerous or an emergency and which makes it necessary to deviate from the cleared flight plan, comprising the step of:

using the independent wireless data link to the supervisory authority by a control device of the aircraft or spacecraft to agree to a changed flight plan containing at least one change, wherein after the situation has been identified, a possible deviation from the flight plan is established by the at least one control device of the aircraft or spacecraft and at least one dialogue having the following points is carried out with the supervisory authority via the independent wireless data link:

a. transmitting a clearance request regarding the deviating flight plan by the control device of the aircraft or spacecraft;
b. assessing the clearance request by the supervisory authority and producing a positive or negative assessment result;
c. transmitting the assessment result together with the original clearance request back to the aircraft or spacecraft;
d. comparing the returned assessment result with the originally transmitted clearance request, along with a plausibility check, by the control device of the aircraft or spacecraft; and
e. changing the original flight plan based on the assessment result.

2. The method of claim 1, wherein the supervisory authority is formed by a control center.

3. The method of claim 1, wherein the supervisory authority is formed by an air traffic control station.

4. The method of claim 1, wherein the control device transmits at least one clearance request to the supervisory authority and, following the response therefrom, reacts based on the result.

5. The method of claim 1, wherein the sensor device is formed by at least one sensor arranged on the aircraft or spacecraft.

6. The method of claim 1, wherein the sensor device is formed by a data receiving device.

7. The method of claim 1, wherein the sensor device is formed by a telemetry system.

8. The method of claim 1, wherein the sensor device is formed by a function monitoring device.

9. The method of claim 1, wherein the situation to be identified by the sensor device is at least one of the development of severe weather conditions, damage to a drive system, the failure of at least one system which is important to or necessary for the flight operation, a hailstorm, or a fuel shortage.

10. The method of claim 1, wherein a Very High Frequency or Ultra High Frequency wireless data link is established as the independent wireless data link.

11. The method of claim 10, wherein a Very High Frequency data link is established as the wireless data link.

12. The method of claim 11, wherein a Very High Frequency data link Mode 2 link is established as the wireless data link.

13. The method of claim 1, wherein the control device of the aircraft or spacecraft comprises at least a flight management system or is itself part of such a system.

14. The method of claim 1, wherein the control device of the aircraft or spacecraft comprises at least a flight control system or is itself part of such a system.

15. The method of claim 1, wherein the control device of the aircraft or spacecraft comprises at least an autopilot system or is itself part of such a system.

16. The method of claim 1, wherein the at least one change to the flight plan comprises at least one of a change in altitude and a change of course of the aircraft or spacecraft.

17. The method of claim 1, wherein the change to the original flight plan under point e., in the event of a positive assessment result, is converted to an updated flight plan of the aircraft or spacecraft as proposed.

18. The method of claim 1, wherein on account of the comparison of the returned assessment result with the plausibility check under point d., in the event of a negative assessment result, a further dialogue regarding an alternative change to the flight plan for the aircraft or spacecraft is initiated by the control device of the aircraft or spacecraft with the supervisory authority.

19. The method of claim 1, wherein on account of the change to the original flight plan under point e., in the event of a negative assessment result, the control device subsequently undertakes a measure regarding the flight plan other than seeking the clearance request regarding the deviating flight plan.

20. The method of claim 19, wherein the measure comprises the original flight plan being retained.

21. The method of claim 19, wherein the measure comprises the control device carrying out an unauthorized change to the flight plan.

22. The method of claim 1, wherein the supervisory authority initiates a dialogue with the at least temporarily unmanned aircraft or spacecraft and communicates, to the control device thereof, a deviation from the flight plan as a proposal or as a counterproposal to a clearance request.

23. The method of claim 1, wherein the supervisory authority checks the change to the flight plan with a remote pilot in command via a communication path independent of the command and control link and independent of the independent wireless data link.

24. An at least temporarily unmanned aircraft or spacecraft which travels through a controlled airspace in accordance with a previously cleared flight plan, in which the aircraft or spacecraft is in communication with a pilot in command via a command and control link, and is in communication with a supervisory authority via a separate and independent wireless data link, in which aircraft or spacecraft the command and control link, via which the aircraft or spacecraft can be or is controlled, is least temporarily unavailable, and which aircraft or spacecraft is provided with a sensor device which is configured to identify a situation being at least one of dangerous or an emergency, which makes it necessary to deviate from the cleared flight plan, wherein the aircraft or spacecraft has a control device which is configured to independently use the independent wireless data link to the supervisory authority in order to agree to a changed flight plan containing at least one change, wherein after the situation has been identified, a possible deviation from the flight plan is established by the at least one control device of the aircraft or spacecraft and at least one dialogue having the following points is carried out with the supervisory authority via the independent wireless data link:

a. transmitting a clearance request regarding the deviating flight plan by the control device of the aircraft or spacecraft;
b. assessing the clearance request by the supervisory authority and producing a positive or negative assessment result;

c. transmitting the assessment result together with the original clearance request back to the aircraft or spacecraft;
d. comparing the returned assessment result with the originally transmitted clearance request, along with a plausibility check, by the control device of the aircraft or spacecraft; and
e. changing the original flight plan based on the assessment result.

* * * * *